(12) United States Patent
Jang et al.

(10) Patent No.: US 10,236,481 B2
(45) Date of Patent: Mar. 19, 2019

(54) RECHARGEABLE BATTERY WITH CONNECTED CAP PLATE AND CURRENT COLLECTOR

(71) Applicant: SAMSUNG SDI CO., LTD., Yongin-si, Gyeonggi-do (KR)

(72) Inventors: Myung-Jae Jang, Yongin-si (KR); Chi-Young Lee, Yongin-si (KR); Sang-Won Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 447 days.

(21) Appl. No.: 14/927,368

(22) Filed: Oct. 29, 2015

(65) Prior Publication Data

US 2016/0308177 A1    Oct. 20, 2016

(30) Foreign Application Priority Data

Apr. 17, 2015 (KR) .................. 10-2015-0054588

(51) Int. Cl.
*H01M 2/02* (2006.01)
*H01M 2/08* (2006.01)
*H01M 2/26* (2006.01)
*H01M 2/04* (2006.01)

(52) U.S. Cl.
CPC ............ *H01M 2/08* (2013.01); *H01M 2/263* (2013.01); *H01M 2/0473* (2013.01)

(58) Field of Classification Search
CPC ....... H01M 2/08; H01M 2/263; H01M 2/0473
See application file for complete search history.

(56) References Cited

U.S. PATENT DOCUMENTS

2010/0279156 A1    11/2010    Kim et al.
2012/0021277 A1    1/2012    Byun et al.
2013/0122355 A1    5/2013    Kim et al.

FOREIGN PATENT DOCUMENTS

EP    2 388 844 A1    11/2011
EP    2 498 318 A1    9/2012
KR    10-2012-0085643    *    8/2012    .............. H01M 2/06

OTHER PUBLICATIONS

EPO Office Action dated May 29, 2017, for corresponding European Patent Application No. 15201306.6 (5 pages).
EPO Search Report dated Mar. 24, 2016, for corresponding European Patent application 15201306.6, (11 pages).

* cited by examiner

*Primary Examiner* — Raymond Alejandro
(74) *Attorney, Agent, or Firm* — Lewis Roca Rothgerber Christie LLP (57) ABSTRACT

A rechargeable battery includes an electrode assembly including first and second electrodes; a case in which the electrode assembly is accommodated; a cap plate combined to the case; an electrode terminal provided in the cap plate and including first and second electrode terminals; and a lead tab including first and second current collecting tabs for electrically connecting the electrode assembly to the electrode terminal, wherein the second current collecting tab includes an electrode connecting portion that is connected to the electrode assembly, and a terminal connecting portion that is bent from the electrode connecting portion and electrically coupled to the cap plate.

8 Claims, 8 Drawing Sheets

RECHARGEABLE BATTERY WITH CONNECTED CAP PLATE AND CURRENT COLLECTOR

CROSS-REFERENCE TO RELATED APPLICATION

This application claims priority to and the benefit of Korean Patent Application No. 10-2015-0054588 filed in the Korean Intellectual Property Office on Apr. 17, 2015, the entire contents of which are incorporated herein by reference.

BACKGROUND

1. Field

The present invention relates to a rechargeable battery.

2. Description of the Related Art

Generally, a rechargeable battery differs from a primary battery in that a rechargeable battery can be repeatedly charged and discharged, while a primary battery is incapable of being recharged. Low-capacity rechargeable batteries are used in small portable electronic devices such as mobile phones, notebook computers, and camcorders, while high-capacity rechargeable batteries are widely used as a power source for driving the motor of a hybrid vehicle.

Typical rechargeable batteries include a nickel-cadmium (Ni—Cd) battery, a nickel-metal hydride (Ni-MH) battery, a lithium (Li) battery, a lithium ion (Li-ion) battery, etc. Particularly, a lithium ion rechargeable battery typically has an operating voltage about three times as high as a Ni—Cd battery or a Ni-MH battery that is widely used as a power supply for electronic devices. In addition, the lithium ion rechargeable battery has been widely used because its energy density per unit weight is high.

In some rechargeable batteries, a lithium-based oxide is used as a positive active material, and a carbon material is used as a negative active material. Generally, batteries are classified into a liquid electrolyte battery and a polymer electrolyte battery depending on the type of electrolyte, and lithium batteries using a liquid electrolyte are called lithium ion batteries while batteries using a polymer electrolyte are called lithium polymer batteries.

In such a rechargeable battery, an electrode assembly and an electrode terminal are sometimes connected via a lead tab. In this case, the lead tab is electrically coupled to the electrode terminal that is provided to penetrate the cap plate by welding or the like.

However, if an abnormality of the rechargeable battery occurs between the cap plate and the electrode terminal, leakage of an electrolyte solution and the like may occur. Accordingly, since a gasket and the like are provided between the cap plate and the electrode terminal to prevent leakage of the electrolyte solution, many parts are required.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a rechargeable battery having a reduced number of parts without causing leakage of an electrolyte solution.

An exemplary embodiment of the present invention provides a rechargeable battery including: an electrode assembly including first and second electrodes; a case in which the electrode assembly is accommodated; a cap plate combined to an opening of the case; an electrode terminal provided in the cap plate and including first and second electrode terminals; and a lead tab including a first current collecting tab and a second current collecting tab for connecting the electrode assembly to the electrode terminal.

The second current collecting tab includes an electrode connecting portion that is connected to the electrode assembly, and a terminal connecting portion that is bent from the electrode connecting portion to be electrically coupled to the cap plate.

The terminal connecting portion may be welded to the cap plate.

A protrusion portion may be formed in the cap plate, and an insertion portion may be formed in the terminal connecting portion to be inserted in the protrusion portion.

The protrusion portion may include: a first protrusion protruding from a surface of the cap plate facing the electrode assembly; and a pair of second protrusions protruding toward the electrode assembly at lateral sides of the first protrusion while interposing the first protrusion therebetween.

The first protrusion may be a circular protrusion that protrudes toward the electrode assembly from the cap plate.

The second protrusion may be a straight line-shaped protrusion that protrudes toward the electrode assembly from the cap plate.

The insertion portion may include: an insertion hole into which the first protrusion is inserted; and a recess portion with lateral surfaces contacting the second protrusion.

The first protrusion may be forcedly fitted into the insertion hole.

The protrusion portion may be welded to the insertion portion while contacting the insertion portion.

The protrusion portion may include: a first insertion protrusion protruding from a surface of the cap plate facing the electrode assembly; and a second insertion protrusion protruding from the cap plate while being separated from the first insertion protrusion.

The insertion portion may include: a concave groove contacting a lateral surface of the first insertion protrusion; and a mounting groove mounted with the second insertion protrusion and formed at an edge of the terminal connecting portion.

According to the exemplary embodiment of the present invention, the positive electrode current collecting tab can be stably connected to the protrusion portion of the cap plate by welding while being connected thereto by using a press-fit method of forced insertion thereof. Accordingly, the current collecting tab and the cap plate can be connected with a simple structure, so the cost can be reduced since additional parts are not required for the connection.

According to the exemplary embodiment of the present invention, the positive electrode current collecting tab is directly connected to the cap plate, so the leakage of the electrolyte solution can be prevented since the terminal hole is not required at a position of the positive electrode current collecting tab. In addition, sealing members such as the gasket and the like can be eliminated in the terminal hole, thereby reducing the cost.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive, and like reference numerals designate like elements throughout the specification.

Figure 1:
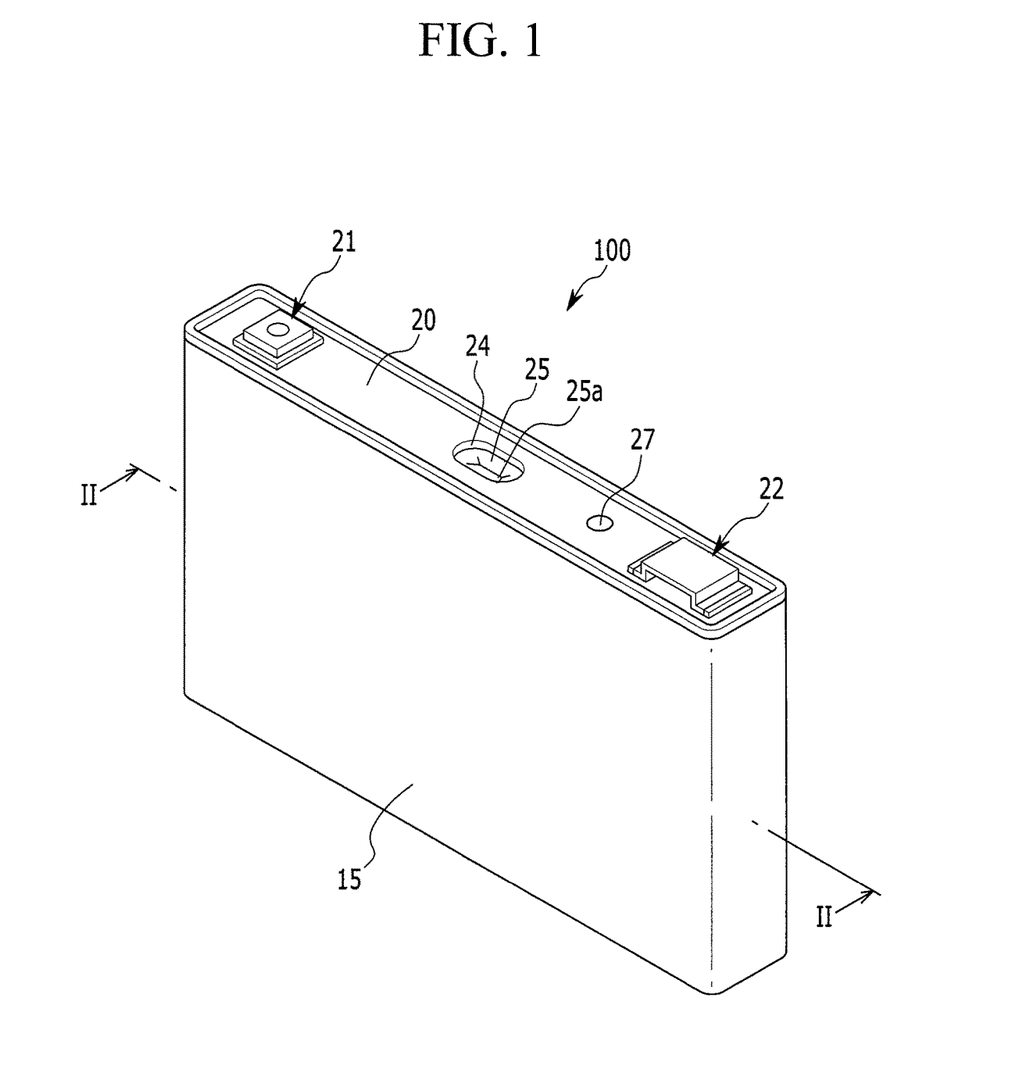
FIG. 1 is a schematic perspective view of a rechargeable battery according to a first exemplary embodiment of the present invention.
Figure 2:
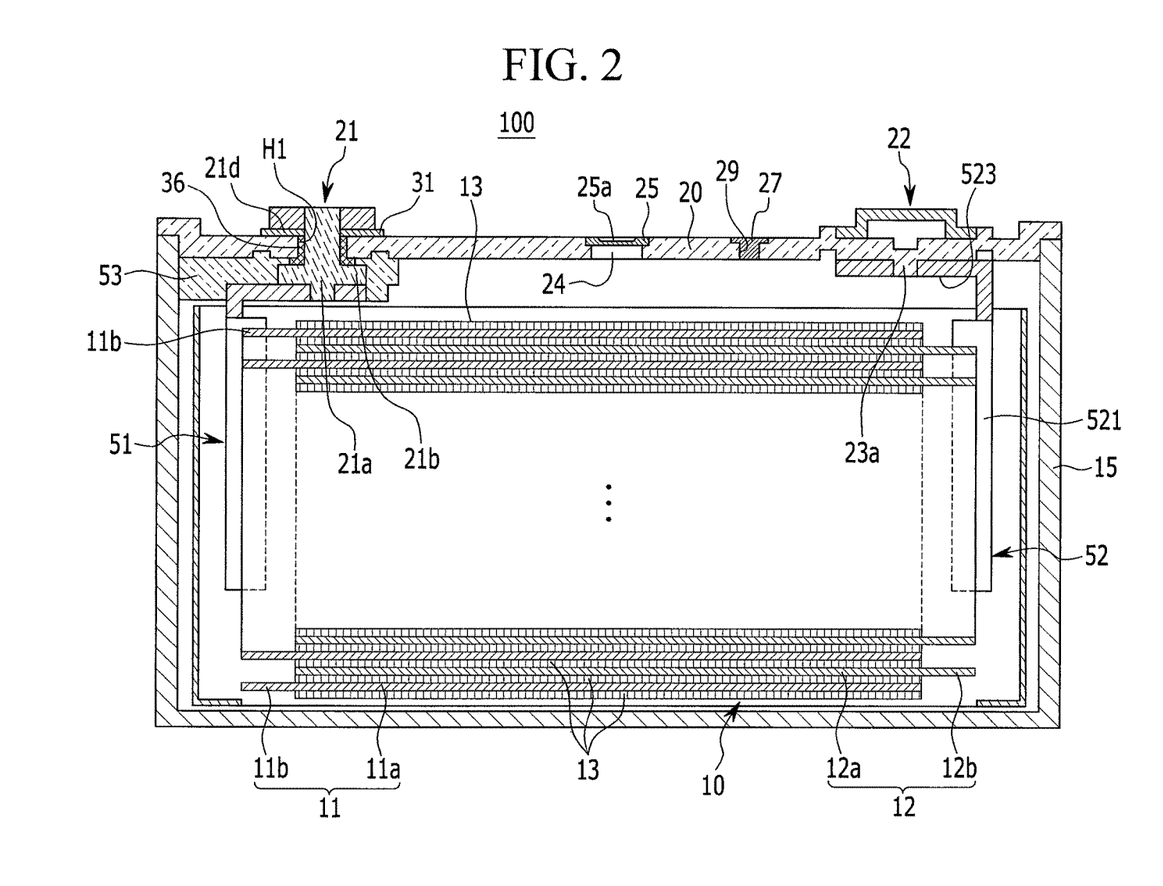
FIG. 2 is a cross-sectional view of the rechargeable battery of FIG. 1 taken along the line II-II.

FIG. 1 is a schematic perspective view of a rechargeable battery according to a first exemplary embodiment of the present invention, and FIG. 2 is a cross-sectional view of the rechargeable battery of FIG. 1 taken along the line II-II.

As shown in FIGS. 1 and 2, the rechargeable battery 100 according to the first exemplary embodiment of the present invention includes: an electrode assembly 10 including first and second electrodes 11 and 12; a case 15 in which the electrode assembly 10 is accommodated; a cap plate 20 combined to an opening of the case 15; electrode terminals 21 and 22 provided in the cap plate 20 and including first and second electrode terminals 21 and 22; and lead tabs including first and second current collecting tabs 51 and 52 configured to connect the electrode assembly 10 to the electrode terminals 21 and 22, wherein the second current collecting tab 52 is electrically coupled to the cap plate 20.

For example, the electrode assembly 10 is formed by disposing the first electrode (hereinafter referred to as a "negative electrode") 11 and the second electrode (hereinafter referred to as a "positive electrode") 12 at opposite surfaces of a separator 13, which serves as an insulator, and spirally winding the negative electrode 11, the separator 13, and the positive electrode 12 in a jelly-roll state.

The positive and negative electrodes 11 and 12 respectively include coated regions 11a and 12a where an active material is coated on a current collector made of a metal plate, and uncoated regions 11b and 12b which are formed as exposed current collectors since an active material is not coated thereon.

The uncoated region 11b of the negative electrode 11 is formed at one end portion of the negative electrode 11 along the wound negative electrode 11. The uncoated region 12b of the positive electrode 12 is formed at one end portion of the positive electrode 12 along the wound positive electrode 12. Accordingly, the uncoated regions 11b and 12b are located at opposite end portions of the electrode assembly 10.

In one embodiment, the case 15 is formed in the shape of a substantial cuboid, having a space for accommodating the electrode assembly 10 and an electrolyte solution, and the opening is formed at one side of the cuboid to allow the electrode assembly 10 to be inserted into the case 15.

The cap plate 20 is installed in the opening of the case 15 to close and seal the case 15. For example, the case 15 and the cap plate 20 may be welded to each other and may be made of aluminum.

In addition, the cap plate 20 is provided with an electrolyte injection opening 29, a vent hole 24, and a terminal hole H1. After combining the cap plate 20 to the case 15, the electrolyte injection opening 29 allows the electrolyte solution to be injected into the case 15. After the injection of the electrolyte solution, the electrolyte injection opening 29 is sealed by a sealing cap 27. The vent hole 24 is formed to discharge internal pressure of the rechargeable battery 100.

The electrode terminals include first and second electrode terminals 21 and 22, and are provided in the cap plate 20 and are electrically coupled to the electrode assembly 10. In this case, the first electrode terminal 21 is a negative electrode terminal, while the second electrode terminal 22 is a positive electrode terminal.

In other words, the negative electrode terminal 21 is electrically coupled to the negative electrode 11 of the electrode assembly 10, and the positive electrode terminal 22 is electrically coupled to the cap plate 20 by welding or the like to be connected to the positive electrode via the second current collecting tab 52.

The negative electrode terminal 21 will be described in more detail. The negative electrode terminal 21 is provided in the terminal hole H1 of the cap plate 20, and includes a rivet terminal 21a that is electrically coupled to the electrode assembly 10.

One end of the rivet terminal 21a is electrically coupled to the electrode assembly 10 inside the case 15 by welding or the like. In addition, the other end of the rivet terminal 21a may protrude out of the terminal hole H1.

A negative electrode gasket 36 is provided between the rivet terminal 21a of the negative electrode terminal 21 and an inner surface of the terminal hole H1 of the cap plate 20 to seal and electrically insulate between the rivet terminal 21a of the negative electrode terminal 21 and the cap plate 20.

The negative electrode gasket 36 is provided to be further extended between a flange 21b and an inner surface of the cap plate 20, thereby sealing and electrically insulating between the flange 21b and the cap plate 20. In other words, the negative electrode gasket 36 prevents leakage of the electrolyte solution via the terminal hole H1 when the negative and positive electrode terminals 21 and 22 are installed in the cap plate 20.

The lead tabs are configured to electrically connect the electrode assembly 10 to the electrode terminals 21 and 22, and include a first current collecting tab 51 and a second current collecting tab 52. In this case, the first current collecting tab 51 is a negative electrode current collecting tab, while the second current collecting tab 52 is a positive electrode current collecting tab.

The negative electrode current collecting tab 51 electrically couples the negative electrode terminal 21 to the negative electrode 11 of the electrode assembly 10. In other words, by combining the negative electrode current collecting tab 51 to a lower end of the rivet terminal 21a and then caulking the lower end thereof, the negative electrode current collecting tab 51 is supported by the flange 21b and is connected to the lower end of the rivet terminal 21a.

One side of the positive electrode current collecting tab 52 is electrically coupled to the positive electrode 12, and the other side thereof is electrically coupled to the cap plate 20. This will be described below in detail with reference to the drawings.

The positive electrode current collecting tab 52 includes an electrode connecting portion 521 that is connected to the electrode assembly 10, and a terminal connecting portion 523 that is bent from the electrode connecting portion 521 to be connected to the cap plate 20.

The electrode connecting portion 521 is electrically coupled to the uncoated region of the electrode assembly 10. The terminal connecting portion 523 is integrally formed with the electrode connecting portion 521 while it is bent.

The terminal connecting portion 523 may be connected to the electrode connecting portion 521 and be bent to be parallel to a surface of the cap plate 20. The terminal connecting portion 523 may be welded while being press-fitted to the cap plate 20 inside of the case 15.

Figure 3:
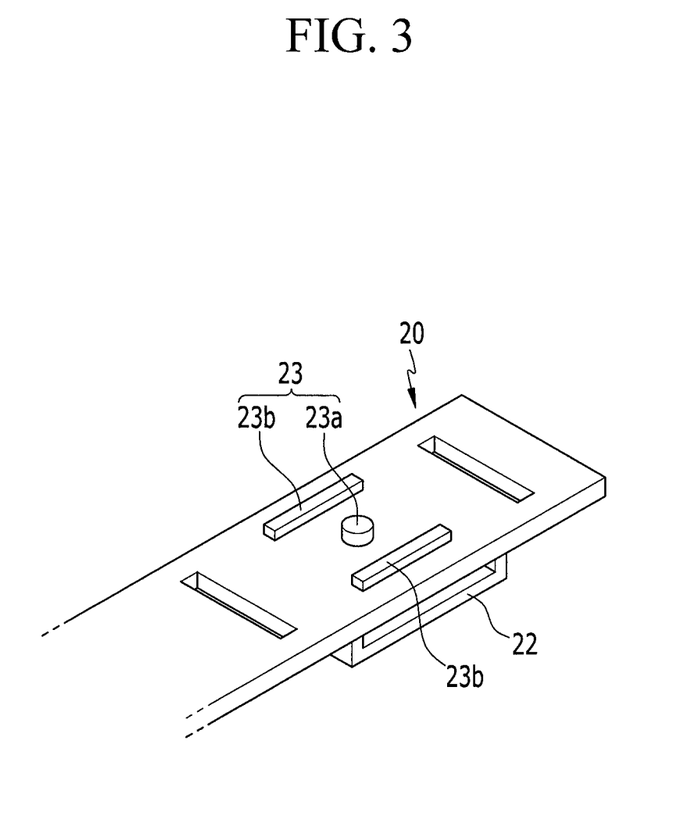
FIG. 3 is a partial schematic perspective view of a cap plate of FIG. 1 formed with a protrusion portion.

FIG. 3 is a partial schematic perspective view of a cap plate of FIG. 1 formed with a protrusion portion.

As shown in FIG. 3, a protrusion portion 23 is formed in the cap plate 20 to protrude toward the terminal connecting portion 523.

The protrusion portion 23 may include a first protrusion 23a that protrudes from the surface of the cap plate 20, and second protrusions 23b that protrude from lateral sides of the first protrusion 23a.

Figure 4:
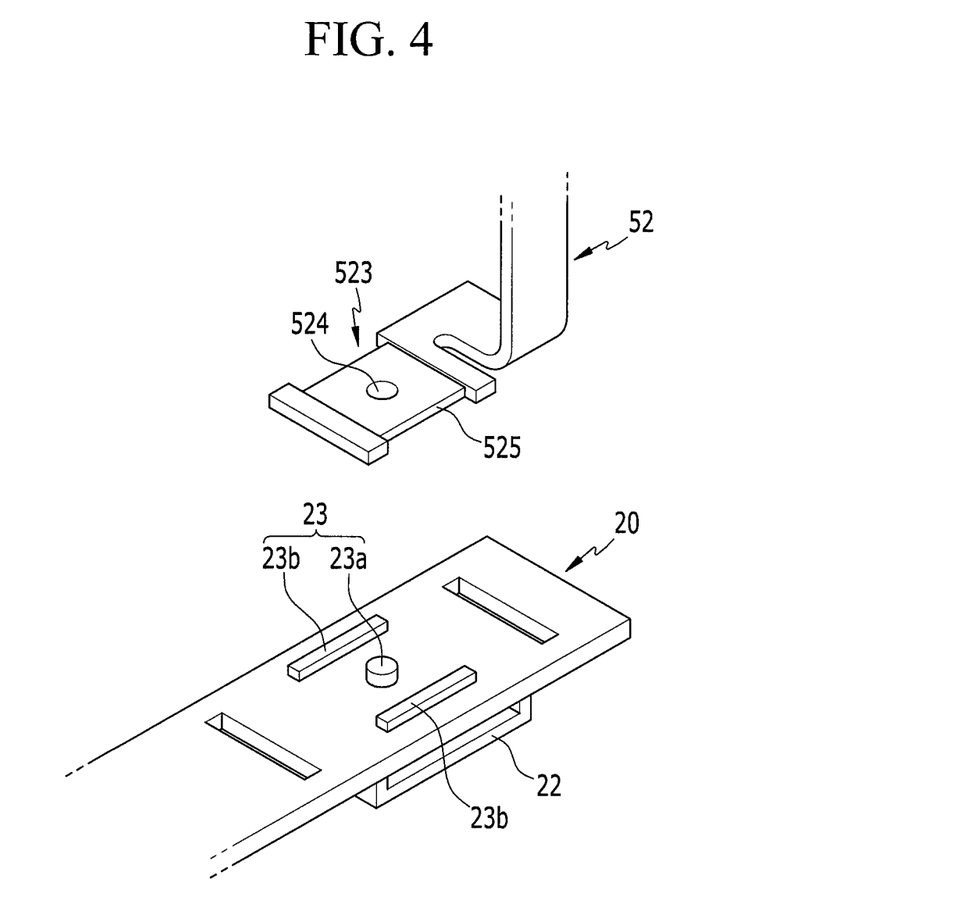
FIG. 4 is a partial schematic perspective view of connected portions of a second current collecting tab and a cap plate of the rechargeable battery of FIG. 1.

The first protrusion 23a protrudes toward the electrode assembly 10 inside the case 15, and in the current exemplary embodiment, may protrude in the shape of a circular protrusion. With reference also to FIG. 4, the first protrusion 23a may be forcibly fitted into insertion portions 524 and 525, which are formed in the terminal connecting portion 523, to be press-fitted thereto. The first protrusion 23a is stably connected to the insertion portions 524 and 525 by welding after being press-fitted thereto.

The second protrusions 23b may protrude from the surface of the cap plate 20 at opposite lateral sides of the first protrusion 23a while locating the first protrusion 23a therebetween. In the current exemplary embodiment, the second protrusions 23b may protrude as a straight line-shaped protrusion. After contacting the insertion portions 524 and 525 formed in the terminal connecting portion 523, the second protrusions 23b are welded thereto. The first protrusion 23a and the second protrusions 23b being welded to the insertion portions 524 and 525 will be described in detail when describing the insertion portions 524 and 525 below.

Figure 5:
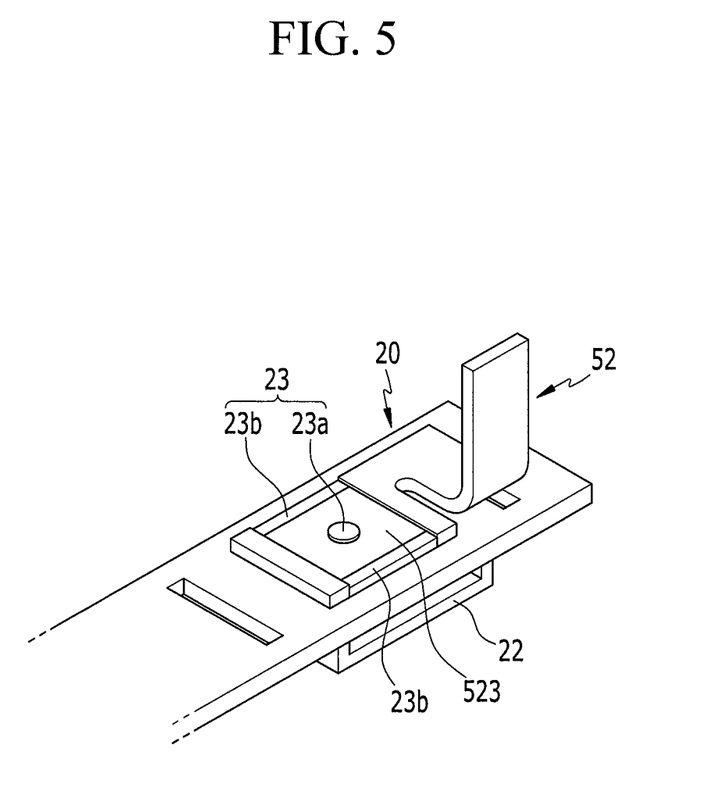
FIG. 5 is a partial schematic perspective view of the second current collecting tab and the cap plate of FIG. 4 being connected to each other.

FIG. 4 is a partial schematic perspective view of connected portions of a second current collecting tab and a cap plate of the rechargeable battery of FIG. 1, and FIG. 5 is a partial schematic perspective view of the second current collecting tab and the cap plate of FIG. 4 being connected to each other.

As shown in FIGS. 4 and 5, the insertion portions 524 and 525 are formed in the terminal connecting portion 523 of the second electrode tab 52, and may include recess portions 525 formed at edges of the terminal connecting portion 523, and an insertion hole 524 formed between the recess portions 525 in the terminal connecting portion 523.

The insertion hole 524 is formed to penetrate the terminal connecting portion 523, and may be formed at a position to face the first protrusion 23a. In other words, the insertion hole 524 may be formed such that it has a circular shape in accordance with the circular shape of the first protrusion 23a to penetrate the terminal connecting portion 523. In the current exemplary embodiment, the insertion hole 524 is formed in accordance with the number of first protrusions 23a, and may be integrally formed with the terminal connecting portion 523. However, if the number of first protrusions 23a is changed, a modified embodiment including at least two insertion holes 524 may be possible. The recess portions 525 are formed at lateral sides of the insertion hole 524.

As such, the insertion hole 524 may be formed in the terminal connecting portion 523 to be press-fitted to the first protrusion 23a. The first protrusion 23a may be more stably connected to the insertion hole 524 by welding while being press-fitted thereto.

The recess portions 525 may be respectively formed at opposite lateral sides of the terminal connecting portion 523 while locating the insertion hole 524 therebetween, and more specifically, the recess portions 525 may be respectively formed at the opposite edges of the terminal connecting portion 523 facing each other.

The recess portions 525 may contact lateral surfaces of the second protrusion 23b when the terminal connecting portion 523 is connected to the cap plate 20. As such, since the recess portions 525 are inserted between a pair of second protrusions 23b, the terminal connecting portion 523 may be stably connected to the cap plate 20 while it is correctly positioned to be connected thereto.

As described above, the positive electrode current collecting tab 52 may be welded at an inner surface of the cap plate 20, while the protrusion portion 23 formed in the cap plate 20 is inserted in the insertion portions 524 and 525 formed in the terminal connecting portion 523.

Accordingly, the positive electrode current collecting tab 52 may be stably connected to the cap plate 20 by welding while the cap plate 20 is prevented from being separated by using a press-fit method of forcible fitting of the protrusion portion 23. Accordingly, since the positive electrode current collecting tab 52 and the cap plate 20 can be connected in a simple structure, additional parts for connection are not required, so cost can be reduced.

In addition, since the positive electrode current collecting tab 52 is directly connected to the cap plate 20 such that the terminal hole is not required at a position of the positive electrode current collecting tab 52, leakage of the electrolyte solution can be prevented. In addition, sealing members such as the gasket and the like can be eliminated in the terminal hole, thereby reducing the cost.

With reference again to FIG. 2, lower insulating members 53 are respectively provided between the negative electrode current collecting tab 51 and the cap plate 20 to electrically insulate the negative electrode current collecting tab 51 from the cap plate 20. In addition, since one side of the lower insulating member 53 is combined to the cap plate 20 and the other side thereof encloses the negative electrode current collecting tab 51, the rivet terminal 21a, and the flange 21b, a connection structure therebetween can be stabilized.

An upper insulating member 31 near the negative electrode terminal 21 electrically insulates between the negative electrode terminal 21 and the cap plate 20.

The upper insulating member 31 is located between the negative electrode terminal 21 and the cap plate 20, and is penetrated by the rivet terminal 21a. Accordingly, by combining the upper insulating member 31 to an upper end of the rivet terminal 21a and then caulking the upper end thereof, the upper insulating member 31 may be combined to the upper end of the rivet terminal 21a.

Figure 6:
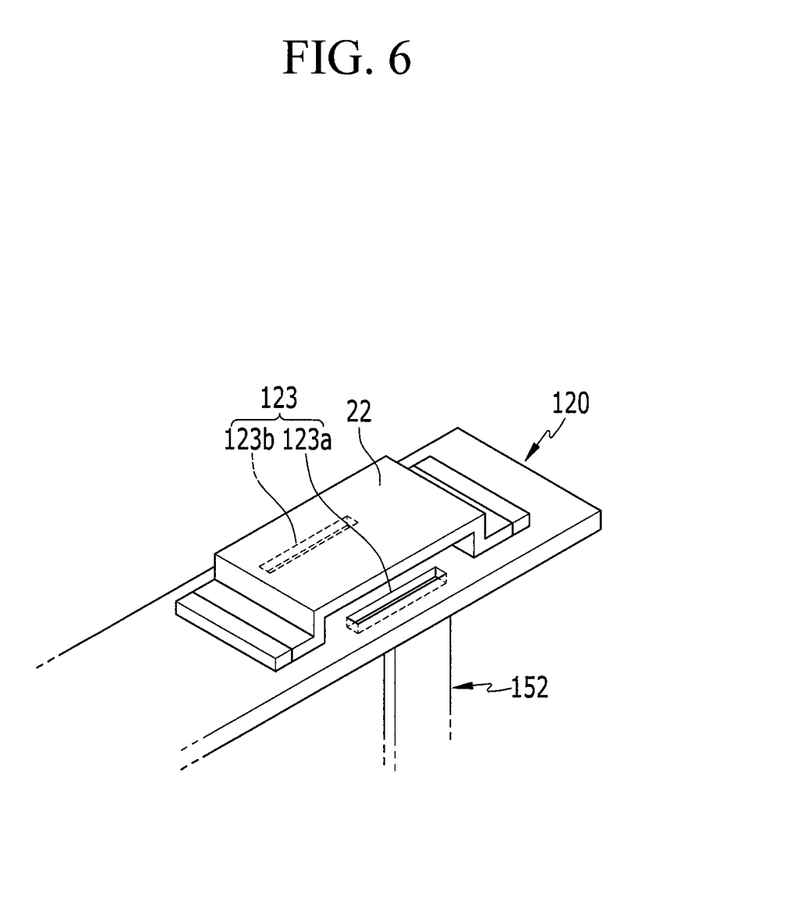
FIG. 6 is a partial schematic perspective view of connected portions of a current collecting tab and a cap plate of a rechargeable battery according to a second exemplary embodiment of the present invention.
Figure 7:
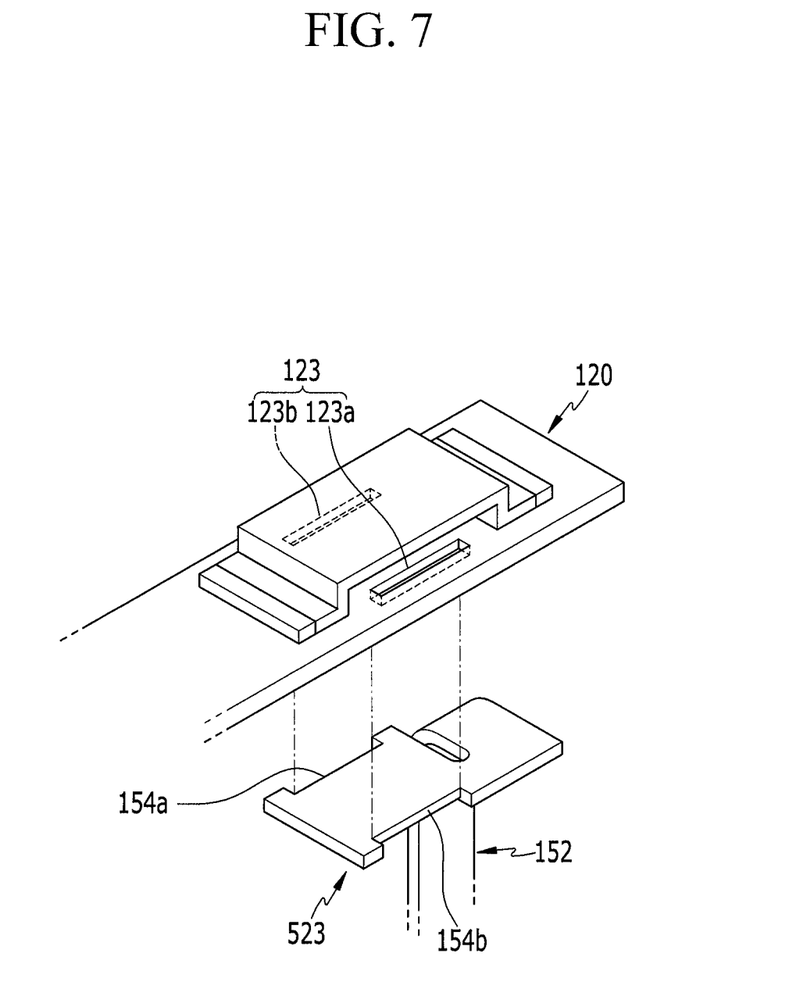
FIG. 7 is a partial schematic exploded perspective view of the connected portions of the current collecting tab and the cap plate of FIG. 6.

FIG. 6 is a partial schematic perspective view of connected portions of a current collecting tab and a cap plate of a rechargeable battery according to a second exemplary embodiment of the present invention, and FIG. 7 is a partial schematic exploded perspective view of the connected portions of the current collecting tab and the cap plate of FIG. 6. The same reference numerals as those in FIGS. 1 to 5 refer to the same members having the same functions. A detailed description of the same reference numerals will be omitted hereinafter.

As shown in FIGS. 6 and 7, an insertion portion 154a, 154b is formed in a positive electrode current collecting tab 152 of the rechargeable battery according to the second exemplary embodiment of the present invention, and a protrusion portion 123 is formed in a cap plate 120 to be inserted in the insertion portion 154a, 154b.

The protrusion portion 123 is formed at an inner wall surface of the cap plate 120 inside the case 15, and may include a first insertion protrusion 123a and a second insertion protrusion 123b that protrudes to be separated from the first insertion protrusion 123a.

The first insertion protrusion 123a may be formed by a forging process such that it protrudes in an inner direction of the case 15 from the cap plate 20. The first insertion protrusion 123a may protrude such that it is longer in a length direction of the cap plate 120. The second insertion protrusion 123b protrudes at a lateral side of the first insertion protrusion 123a.

The second insertion protrusion 123b may protrude to have the same shape and length as the first insertion protrusion 123a while being spaced from the first insertion protrusion 123a.

As such, the first insertion protrusion 123a and the second insertion protrusion 123b may protrude inward of the case 15 from the surface of the cap plate 120, and may be connected to the insertion portion 154a, 154b of the positive electrode current collecting tab 152.

The insertion portion 154a, 154b includes a concave groove 154b that is formed in the terminal connecting portion 523 to contact a lateral surface of the first insertion protrusion 123a, and a mounting groove 154a that is mounted with the second insertion protrusion 123b and is formed at an edge of the terminal connecting portion 523.

The concave groove 154b is formed at the edge of the terminal connecting portion 523 to contact the first insertion protrusion 123a. As such, the first insertion protrusion 123a may be stably connected to a lateral surface of the concave groove 154b by welding while contacting the lateral surface thereof.

The mounting groove 154a may be formed at the edge of the terminal connecting portion 523 opposite the concave groove 154b. The mounting groove 154a contacts a protruding end portion and one lateral surface of the second insertion protrusion 123b after the second insertion protrusion 123b is mounted.

In other words, after the mounting groove 154a is mounted, the second insertion protrusion 123b may be partially exposed toward the lateral surface of the terminal connecting portion 523. The exposed portion of the second insertion protrusion 123b may be stably welded by horizontal straight line welding. Accordingly, since the positive electrode current collecting tab 152 is connected and welded to the cap plate 120 in a simple structure, minimal parts can be used when connecting the positive electrode current collecting tab 152 to the cap plate 120, thereby reducing a manufacturing cost.

Figure 8:
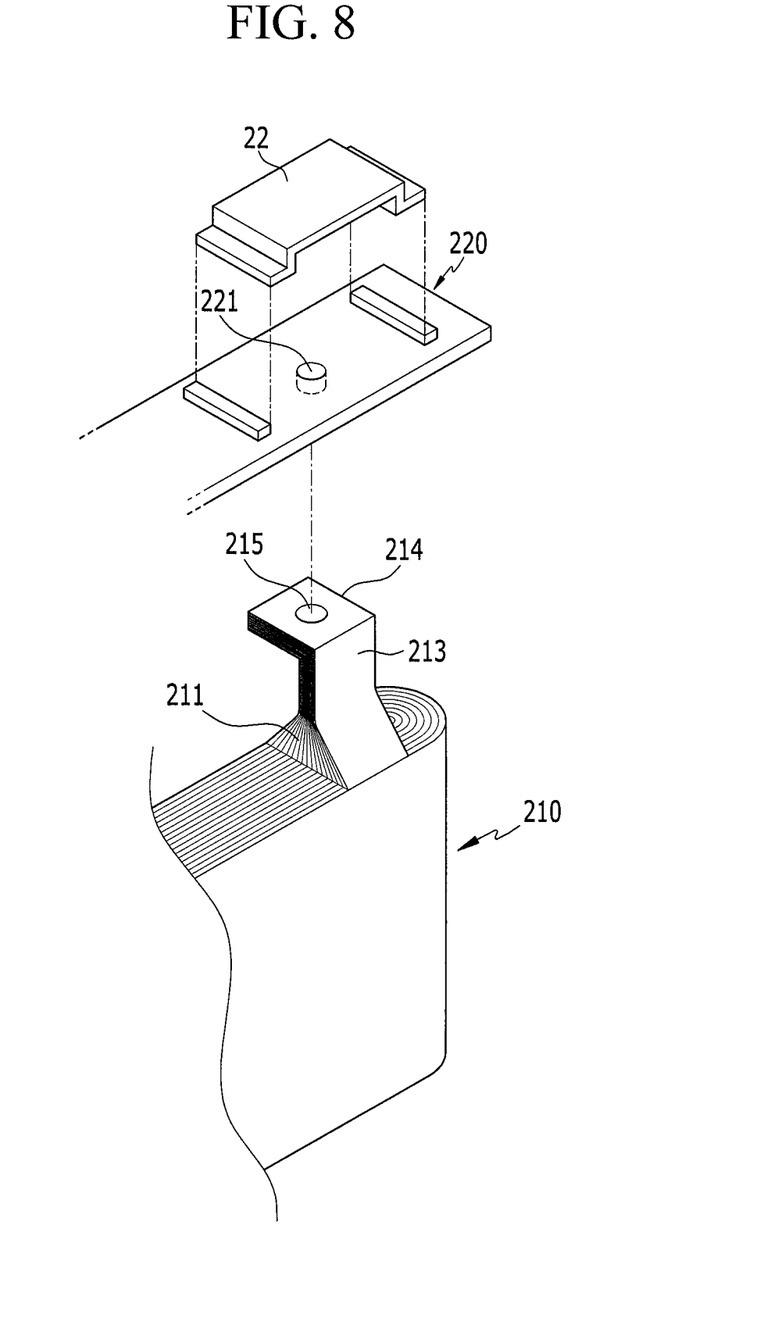
FIG. 8 is a partial schematic perspective view of connected parts of an electrode assembly and a cap plate of a rechargeable battery according to a third exemplary embodiment of the present invention.

FIG. 8 is a partial schematic perspective view of connected parts of an electrode assembly and a cap plate of a rechargeable battery according to a third exemplary embodiment of the present invention. The same reference numerals as those in FIGS. 1 to 7 refer to the same members having the same functions. A detailed description of the same reference numerals will be omitted hereinafter.

As shown in FIG. 8, in an electrode assembly 210 of the rechargeable battery according to the third exemplary embodiment of the present invention, a plurality of multi-tabs 211 may be drawn out toward the cap plate 220 while being spirally wound, thereby forming a current collecting tab 213. In this case, the current collecting tab 213 refers to a positive electrode current collecting tab. Such a configuration in which the multi-tabs 211 of the electrode assembly 10 are drawn out is the disclosed configuration, so a detailed description thereof will be omitted.

In one embodiment, an end portion of the current collecting tab 213 is bent to form a connecting portion 214. A coupling hole 215 is formed in the connecting portion 214. A coupling protrusion 221 formed in the cap plate 20 may be inserted in the coupling hole 215.

The coupling protrusion 221 is press-fitted to the coupling hole 215 while the connecting portion 214 of the current collecting tab 213 is connected to the cap plate 20. Herein, the coupling protrusion 221 may be stably connected to the coupling hole 215 by welding while being press-fitted thereto. Accordingly, while the current collecting tab 213 is connected to the cap plate 20, minimal parts can be used, thereby reducing the manufacturing cost.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of Symbols | |
|---|---|
| 10, 210 . . . electrode assembly | 11 . . . negative electrode |
| 11b . . . uncoated region | |
| 12 . . . positive electrode | 12b . . . uncoated region |
| 15 . . . case | 20, 120, 220 . . . cap plate |
| 21 . . . negative electrode terminal | 21a, 22a . . . rivet terminal |
| 22 . . . positive electrode terminal | 23 . . . protrusion portion |
| 23a . . . first protrusion | 23b . . . second protrusion |
| 24 . . . vent hole | 25 . . . vent plate |
| 27 . . . sealing cap | 29 . . . electrolyte injection opening |
| 51 . . . negative electrode current collecting tab | |
| 52, 152 . . . positive electrode current collecting tab | |
| 53, 54 . . . lower insulating member | 123 . . . protrusion portion |
| 123a . . . first insertion protrusion | 123b . . . second insertion protrusion |
| 154a, 154b . . . insertion portion | 154b . . . concave groove |
| 154a . . . mounting groove | 211 . . . multi-tab |
| 213 . . . current collecting tab | 214 . . . connecting portion |
| 215 . . . coupling hole | 221 . . . coupling protrusion |

What is claimed is:

1. A rechargeable battery comprising:
an electrode assembly including first and second electrodes;
a case in which the electrode assembly is accommodated;
a cap plate combined to the case;

an electrode terminal provided in the cap plate and including first and second electrode terminals; and first and second current collecting tabs for electrically connecting the electrode assembly to the electrode terminal, wherein the second current collecting tab includes an electrode connecting portion that is connected to the electrode assembly, and a terminal connecting portion that is bent from the electrode connecting portion and electrically coupled to the cap plate, wherein a protrusion is formed in the cap plate and is spaced from the electronic terminals, wherein an insertion portion is formed in the terminal connecting portion, and wherein the protrusion is within and welded directly to the insertion portion, wherein the insertion portion includes: an insertion hole accommodating a first protrusion; and a recess portion with lateral surfaces contacting a second protrusion.

2. The rechargeable battery of claim 1, wherein the terminal connecting portion is welded to the cap plate.

3. The rechargeable battery of claim 1, wherein the protrusion includes: the first protrusion protruding from a surface of the cap plate facing the electrode assembly; and a pair of second protrusions protruding toward the electrode assembly at lateral sides of the first protrusion with the first protrusion therebetween.

4. The rechargeable battery of claim 3, wherein the first protrusion is a circular protrusion that protrudes toward the electrode assembly from the cap plate.

5. The rechargeable battery of claim 4, wherein the second protrusion is a linear protrusion that protrudes toward the electrode assembly from the cap plate.

6. The rechargeable battery of claim 1, wherein the first protrusion is force fit into the insertion hole.

7. The rechargeable battery of claim 1, wherein the protrusion includes: a first insertion protrusion protruding from a surface of the cap plate facing the electrode assembly; and a second insertion protrusion protruding from the cap plate while being spaced from the first insertion protrusion.

8. The rechargeable battery of claim 7, wherein the insertion portion includes: a concave groove contacting a lateral surface of the first insertion protrusion; and a mounting groove mounted with the second insertion protrusion and formed at an edge of the terminal connecting portion.

* * * * *